UNITED STATES PATENT OFFICE.

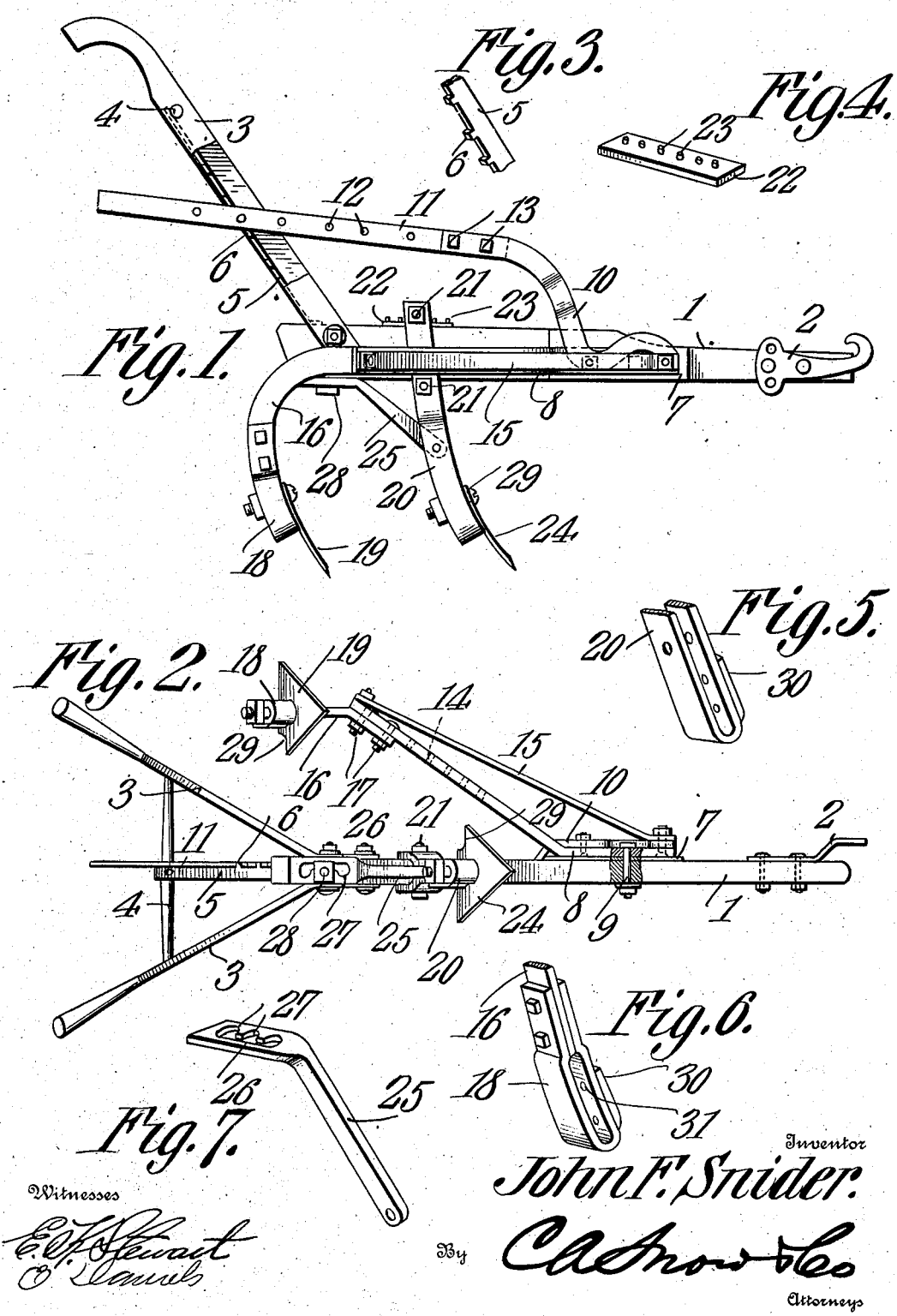

JOHN FRANKLIN SNIDER, OF UNIONVILLE, NORTH CAROLINA.

PLOW.

No. 893,106.   Specification of Letters Patent.   Patented July 14, 1908.

Application filed January 11, 1908. Serial No. 410,455.

*To all whom it may concern:*

Be it known that I, JOHN FRANKLIN SNIDER, a citizen of the United States, residing at Unionville, in the county of Union and State of North Carolina, have invented a new and useful Plow, of which the following is a specification.

This invention has relation to plows and it consists in the novel construction and arrangement of its parts as hereinafter shown and described.

The object of the invention is to provide a plow which may be used as a straddle row cultivator or as a breaking plow as desired. The parts of the plow are so arranged that the draft animal and the operator may travel at the side of the row while the shovels carried by the plow operate at the opposite sides of the row. Means is provided for increasing or diminishing the space between the shovels transversely of the row and one shovel is so mounted as to be capable of adjustment vertically with relation to the other shovel whereby the implement may be conveniently used upon hill sides. Means is also provided for adjusting the angle of inclination of the standard to which the fixed shovel is attached.

In the accompanying drawing: Figure 1 is a side elevation of the plow with parts broken away. Fig. 2 is a bottom plan view of the same. Fig. 3 is a detail perspective view of a portion of a rack plate used upon the plow. Fig. 4 is a detail perspective view of a pin plate used upon the plow. Figs. 5 and 6 are detail perspective views of a lower portion of the standard and foot respectively used upon the plow, and Fig. 7 is a detail perspective view of a brace used upon the plow.

The plow consists of the beam 1 to the forward end of which is attached the clevis hook 2. The handles 3, 3 are attached to the rear end of the beam 1 and are connected together at their upper portions by the round 4. The rack strip 5 is attached at its lower end to the beam 1 and at its upper end to the round 4 and forms a supplemental brace for the handles 3. Said strip 5 is provided at its edges with the laterally disposed teeth 6. The plate 7 is attached to the side of the beam 1 and the forward end of the arm 8 bears laterally against the side of the plate 7 and is pivoted thereto by means of the bolt 9. The forward portion of the arm 10 is bolted to the forward portion of the arm 8 and the bar 11 is adjustably secured to the rear end of the arm 10. The bar 11 possesses sufficient resiliency in order to be sprung into the spaces between the teeth 6 of the strip 5. Thus means is provided for swinging the arm 8 upon the bolt 9 and for securing the same in an adjusted position. When the bar 11 is inserted in a space between the teeth 6 at the lower portion of the strip 5 the said bar 11 is shifted longitudinally with relation to the arm 10 so that the rear end of said bar will not unduly project behind the end of the beam 1 and interfere with the operator. Said bar 11 is provided with the perforations 12 which are adapted to receive the bolts 13 and which permit of the adjustment of the said bar upon the arm 10 as above described. The rear end portion of the arm 8 is obliquely disposed with relation to the beam 1 and is provided with a series of perforations 14. The brace 15 is attached at its rear end to the rear end of the arm 8 and at its forward end to the forward end of the arm 10.

The standard 16 is adjustably attached by means of the bolts 17 which are passed through the perforations 14, to the rear portion of the arm 8. The foot 18 is attached to the lower end of the standard 16 and supports the shovel 19. The standard 20 is provided with the cross bolts 21 which lie over the upper and lower edges of the beam 1. The plate 22 is mounted upon the beam 1 and is provided with a series of pins 23. The upper bolt 21 is adapted to lie in the spaces between the said pins 23. The shovel 24 is attached to the lower portion of the standard 20. The brace 25 is pivoted at its lower end to the standard 20. Said brace is provided at its upper end with a slot 26 which is provided at one side with a series of notches 27. The bolt 28 passes transversely through the beam 1 and is adapted to lie in any one of the notches 27. Thus, it will be seen that by loosening the nuts upon the bolts 21 and bolt 28 that the upper portion of the brace 25 may be shifted longitudinally along the beam 1 and when properly adjusted the said brace 25 is moved laterally so as to seat the bolt 28 in one of the notches 27. The nuts on the said bolts are then tightened. Thus, means is provided for regulating the angle of inclination of the standard 20. The angle of inclination of the said standard may also be changed by removing the upper bolt 21 and swinging the said standard 20 and then replacing the said bolt in the standard but between other pins 23 than those between which it originally rested. Thus additional means for changing the angle of inclination of the standard 20 is provided. When the latter means is used it will be observed that the position of the brace 25 upon the beam 1 is not changed. It will also be observed that when the standard 20 has been properly adjusted by either of the said adjusting means it will be firmly held in position against the strain incident to the work which is performed by the shovel 24.

By shifting the standard 16 along the arm 8 the space between the plows 19 and 24 may be increased or diminished as desired. Thus the distance at which the said shovels will operate from the row of plants may be regulated. By swinging the arm 8, as above described, the shovel 19 may be adjusted vertically with relation to the shovel 24 and thus the implement may be adapted for use upon hill sides. The shovels 19 and 24 are scalloped out at one each of their upper corners as at 29 and the shovel 19 may be shifted from the foot 18 to the standard 20 and the shovel 24 may be applied to the foot 18. Thus, the scalloped portion may be disposed toward or away from the row of plants according to the quantity of earth that it is desired to throw toward the plants. The lower portions of the foot 18 and the standard 20 are provided with the wear plates 30 which are held in position by means of rivets 31. When the said plates are worn out they may be removed by cutting and punching out the rivets 31 and new plates may be applied to the said foot and standard. Thus it will be observed that an implement is provided the parts of which are susceptible of adjustment to meet all conditions of the soil and the contour of the ground and which is adapted to cultivate a crop to advantage. It will also be observed that by removing the bolt 9 that the arms 8 and 10 may be detached from the beam 1 and thus the shovel 24 mounted upon the standard 20 may be used as a breaking plow.

Having described my invention, what I claim as new and desire to secure by Letters Patent is:

A plow comprising a beam, a standard attached thereto and adapted to be adjusted at a desired angle to the beam upon a pivot point located below the beam, a supplemental standard pivoted to the side of the beam and adapted to be adjusted at a desired angle to the beam, a rack-bar supported by the beam, and a flexible lever attached to the supplemental standard and adapted to be sprung into engagement with the teeth of the rack-bar.

In testimony that I claim the foregoing as my own, I have hereto affixed my signature in the presence of two witnesses.

JOHN FRANKLIN SNIDER.

Witnesses:
R. C. LONG,
J. E. PRESLOR.